(12) United States Patent
Ray et al.

(10) Patent No.: US 8,948,320 B2
(45) Date of Patent: Feb. 3, 2015

(54) FRAME AND SYMBOL TIMING RECOVERY FOR UNBURSTED PACKETIZED TRANSMISSIONS USING CONSTANT-AMPLITUDE CONTINUOUS-PHASE FREQUENCY-MODULATION

(71) Applicant: National Instruments Corporation, Austin, TX (US)

(72) Inventors: Baijayanta Ray, Bangalore (IN); Nikhil A. Deshmukh, Bangalore (IN)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 14/138,428

(22) Filed: Dec. 23, 2013

(65) Prior Publication Data

US 2014/0105342 A1    Apr. 17, 2014

Related U.S. Application Data

(62) Division of application No. 13/040,850, filed on Mar. 4, 2011, now Pat. No. 8,634,453.

(30) Foreign Application Priority Data

Jul. 30, 2010   (IN) .......................... 1794/DEL/2010

(51) Int. Cl.
*H03D 1/00*   (2006.01)
*H04L 27/01*   (2006.01)
(Continued)

(52) U.S. Cl.
CPC ........ *H04L 7/04* (2013.01); *H04L 27/01* (2013.01); *H04L 27/2647* (2013.01);
(Continued)

(58) Field of Classification Search
USPC .......... 370/203, 241, 350; 375/226, 295, 342, 375/347, 356, 359
See application file for complete search history.

(56) References Cited

U.S. PATENT DOCUMENTS 5,164,959 A * 11/1992 Cai et al. ...................... 375/150
7,561,646 B2   7/2009 Steele et al.
(Continued)

OTHER PUBLICATIONS

Casini, Enrico; Fertonani, Dario; and Calavolpe, Giulio; "Advanced CPM Receiver for the NATO Tactical Narrowband Waveform," The 2010 Military Communications Conference—Unclassified Program—Waveforms and Signal Processing Track, Oct. 2010, pp. 506-511 (6 pages).

(Continued)

*Primary Examiner* — Leon-Viet Nguyen
(74) *Attorney, Agent, or Firm* — Meyertons Hood Kivlin Kowert & Goetzel, P.C.; Jeffrey C. Hood; Mark K. Brightwell

(57) ABSTRACT

A system and method for performing frame and symbol timing synchronization on samples of a received signal that includes a series of frames. Each frame includes a known preamble and payload data. A start-of-frame time is estimated by scanning the received signal samples for the self similarity of two successive preambles. A carrier frequency offset (CFO) is estimated by maximizing a correlation between a magnitude spectrum of the received signal and a magnitude spectrum of a known preamble model. A fine estimate for the CFO is determined by computing a phase difference between samples separated by p repetitions of the base pattern for various values of index p, and computing a slope of a least squares affine fit to the phase differences. Additional operations are performed to find an optimal symbol starting point, to perform carrier phase synchronization and to detect the start of payload data.

20 Claims, 6 Drawing Sheets

(51) Int. Cl.
　　*H04L 27/26*　　(2006.01)
　　*H04L 7/04*　　(2006.01)
　　*H04B 1/10*　　(2006.01)
　　*H04B 1/7073*　　(2011.01)
　　*H04W 84/12*　　(2009.01)
　　*H04W 24/00*　　(2009.01)
　　*H04W 28/04*　　(2009.01)

(52) U.S. Cl.
　　CPC ............. *H04L 27/2662* (2013.01); *H04B 1/10* (2013.01); *H04B 1/7073* (2013.01); *H04W 84/12* (2013.01); *H04L 7/042* (2013.01); *H04W 24/00* (2013.01); *H04L 27/2613* (2013.01); *H04W 28/04* (2013.01)
　　USPC ........... 375/343; 370/350; 370/329; 375/355; 375/365; 375/360

(56) References Cited

U.S. PATENT DOCUMENTS

| | | |
|---|---|---|
| 8,331,863 B2 | 12/2012 | Kleider et al. |
| 2010/0002757 A1 | 1/2010 | Birru et al. |
| 2010/0061320 A1* | 3/2010 | Lakkis ..................... 370/329 |

OTHER PUBLICATIONS

Rockwell Collins, Inc. "Interface Standard: Interoperability Standard for Single-Access 5-kHz and 25-kHz UHF Satellite Communications Channels," Rockwell Collins MIL-STD-188-181c Candidate Draft, Sep. 30, 2001 (126 pages).

Wikipedia Website "Continuous phase modulation," <http://en.wikipedia.org/wiki/Continuous_phase_modulation> Retrieved Jun. 6, 2011 (3 pages).

Wikipedia Website "Minimum-shift keying," <http://en.wikipedia.org/wiki/Minimum-shift_keying>, Retrieved Jun. 6, 2011 (2 pages).

* cited by examiner

> A method for performing carrier phase and frequency offset correction on samples $x_1(n)$ of a received signal. The received signal includes a series of frames. Each frame includes a preamble and payload data. The preamble includes multiple repetitions of a base pattern. The multiple repetitions conform to a constant-amplitude continuous-phase frequency modulation scheme.

⬇ compute a Fourier transform $R(k)$ of a subsequence of the samples $x_1(n)$, wherein the subsequence corresponds to the multiple repetitions of the base pattern within a given one of the preambles  210

⬇ compute a coarse estimate for a carrier frequency offset by maximizing a cyclic cross-correlation between a magnitude of $R(k)$ and a magnitude of spectrum $P(k)$, wherein $P(k)$ is a discrete Fourier transform of a known model of the multiple repetitions of the base pattern  215

⬇ apply a frequency correction to the samples $x_1(n)$ based on the coarse estimate for the carrier frequency offset in order to determine samples $x_2(n)$  220

⬇ compute values $\theta(p)$ of a function $\theta$ corresponding to a number of values of positive integer index p, wherein $\theta(p)$ is a phase difference between a first subsequence of the samples $x_2(n)$ and a second subsequence of the samples $x_2(n)$, wherein the first and second subsequences reside within the given preamble and are separated by a sample distance equal to p repetitions of the base pattern  225

⬇ compute a fine estimate for residual carrier frequency offset by estimating a linear slope of the function $\theta$ relative to positive integer index p  230

⬇ apply a frequency correction to the samples $x_2(n)$ based on the fine estimate for the residual carrier frequency offset in order to determine samples $x_3(n)$  235

⬇ compute an inner product between a model sequence $g(n)$ and a subsequence of the samples $x_3(n)$, wherein the subsequence of the samples $x_3(n)$ resides within the given preamble, wherein the model sequence $g(n)$ corresponds to a subsequence of the known model of the multiple repetitions of the base pattern  240

⬇ apply a phase correction to the samples $x_3(n)$ based on an angle of the inner product in order to obtain samples $x_4(n)$  245

FIG. 2

A method for performing frame and symbol timing synchronization on samples of a received signal. The received signal includes a series of frames. Each frame includes a preamble and payload data. The preamble of each frame includes multiple repetitions of a base pattern and also includes a start-of-message (SOM) word. The multiple repetitions of the base pattern conform a constant-amplitude continuous-phase frequency modulation.

compute a coarse estimate for a start-of-frame time by maximizing a first function of time displacement, wherein the first function is a magnitude of a correlation sum between two windows of the samples of the received signal, wherein a first of the two windows is displaced by an amount equal to the time displacement, wherein a second of the two windows is separated from the first window by a fixed sample distance equal to a frame length 310 shift the samples based on the coarse estimate for the start-of-frame time to determine samples $x_1(n)$ 315 maximize a second function with respect to shift index q, wherein the second function is a sum of square magnitudes of cross-correlation sums $C(s,q)$ over index s, wherein the cross-correlation sum $C(s,q)$ is a cross-correlation sum between a model sequence $p(n)$ and a subsequence of the samples $x_1(n)$ shifted by a sample distance $sSL+q$, where S is a number of symbols in the base pattern, wherein L is the number of samples per symbol, wherein the model sequence $p(n)$ is based on a known model of the base pattern 320 shift the samples $x_1(n)$ by an amount depending on the maximizing value of the shift index q to obtain samples $x_2(n)$ 325 identify a beginning of the payload data within the samples $x_2(n)$ by demodulating the samples $x_2(n)$ to obtain demodulated bits and detecting an end of the start-of-message word in the preamble 330

FIG. 3

FRAME AND SYMBOL TIMING RECOVERY FOR UNBURSTED PACKETIZED TRANSMISSIONS USING CONSTANT-AMPLITUDE CONTINUOUS-PHASE FREQUENCY-MODULATION

PRIORITY CLAIM

This application is a divisional of U.S. patent application Ser. No. 13/040,850, filed on Mar. 4, 2011, titled "Frame and Carrier Synchronization for Unbursted Packetized Transmissions Using Constant-Amplitude Continuous-Phase Frequency-Modulation", invented by Baijayanta Ray and Nikhil A. Deshmukh, which claims the benefit of priority under 35 U.S.C. 119 to Indian Provisional Application No. 1794/DEL/2010, filed with the Patent Office of India on Jul. 30, 2010, titled "Various Receiver Systems and Methods", and invented by Baijayanta Ray, Nikhil Ashok Deshmukh, Pratik Prabhanjan Brahma, Ankit Sethi, Kunal Agarwal, Sartaj Chaudhury, and Utkarsh Gupta. The above-identified applications are hereby incorporated by reference in their entireties as though fully and completely set forth herein.

FIELD OF THE INVENTION

The present invention relates to the field of telecommunication, and more specifically, to performing frame and carrier synchronization on unbursted packetized transmissions that use constant-amplitude continuous-phase frequency-modulation schemes.

DESCRIPTION OF THE RELATED ART

A transmitter maps a sequence $\{a_n\}$ of bits into a sequence of symbols from a given constellation, modulates the symbol stream onto a carrier signal (or an orthogonal pair of carrier signals), and transmits the modulated carrier onto a channel. The modulation may be performed using any constant-amplitude continuous-phase frequency modulation scheme. Multi-modulation Index (multi-h) Continuous Phase Modulation (MHCPM) is an example of such a scheme. A receiver system receives a noise-perturbed version of the transmitted signal from the channel and attempts to faithfully recover the bit sequence $\{a_n\}$ from the received signal so that the number of bits in error between the transmitted and the received stream is minimized. However, in order to faithfully recover the bit sequence $\{a_n\}$, the receiver may require mechanisms for detecting the start of each frame in the bit sequence; for estimating and removing carrier frequency offset from the received signal; for estimating and removing carrier phase offset from the received signal; for detecting the optimal start times (or symbol boundary) for each modulated symbol; and for detecting the start of payload data within each frame. Thus, there exists a need for mechanisms (or improved mechanisms) for achieving any or all of these purposes.

SUMMARY

A method for performing carrier phase and frequency offset correction on samples $x_1(n)$ of a received signal may involve one or more of the processing operations as described below. The received signal includes a series of frames, where each frame includes a preamble and payload data, where the preamble of each frame includes multiple repetitions of a base pattern. The multiple repetitions of the base pattern conform to a constant-amplitude continuous-phase frequency modulation scheme.

The method may include applying a frequency correction to the samples $x_1(n)$ based on a coarse estimate for a carrier frequency offset in order to determine samples $x_2(n)$.

The method may also include computing values $\theta(p)$ of a function $\theta$ for a number of values of positive integer index p, where $\theta(p)$ is a phase difference between a first subsequence of the samples $x_2(n)$ and a second subsequence of the samples $x_2(n)$, where the first and second subsequences reside within a given one of the preambles (i.e., the preamble in a given one of the frames), where the first and second subsequences are separated by a sample distance equal to p repetitions of the base pattern.

The method may also include computing a fine estimate for residual carrier frequency offset by estimating a linear slope of the function $\theta$ relative to positive integer index p.

The method may also include applying a frequency correction to the samples $x_2(n)$ based on the fine estimate for the residual carrier frequency offset in order to determine samples $x_3(n)$.

The method may also include computing a complex inner product between a model sequence g(n) and a subsequence of the samples $x_3(n)$, where the subsequence of the samples $x_3(n)$ resides within the given preamble, where the model sequence g(n) corresponds to a subsequence of a known model of the multiple repetitions of the base pattern.

The method may also include applying a phase correction to the samples $x_3(n)$ based on an angle of the inner product in order to obtain samples $x_4(n)$.

In some embodiments, the method may also include: computing a discrete Fourier transform R(k) of a subsequence of the samples $x_1(n)$, where the subsequence corresponds to the multiple repetitions of the base pattern within the given preamble; and computing the coarse estimate for the carrier frequency offset by maximizing a cyclic cross-correlation between a magnitude of R(k) and a magnitude of spectrum P(k), where P(k) is a discrete Fourier transform of the known model of the multiple repetitions of the base pattern.

In some embodiments, the method may also include: demodulating a payload portion of the samples $x_4(n)$ to obtain information bits, and driving an output device with an output signal derived from the information bits.

In some embodiments, the action of demodulating the payload portion of the samples $x_4(n)$ comprises performing maximum likelihood sequence estimation on the payload portion of the samples $x_4(n)$.

In some embodiments, the constant-amplitude continuous-phase frequency modulation is CPM or MSK.

In some embodiments, the action of computing the fine estimate for residual carrier frequency offset includes performing a least squares linear fit on the data $\{(p,\theta(p))\}$ to obtain the linear slope of the function $\theta$ relative to positive integer index p.

In some embodiments, the samples $x_1(n)$ of the received signal are obtained at a rate that is an integer multiple of an underlying symbol rate.

In some embodiments, the payload data conforms to a second constant-amplitude continuous-phase frequency modulation scheme different from the constant-amplitude continuous-phase frequency modulation scheme used for the multiple repetitions of the base pattern.

A method for performing frame and symbol timing synchronization on samples of a received signal may include one or more of the processing operations described below. The received signal includes a series of frames, where each frame includes a preamble and payload data, where the preamble of each frame includes multiple repetitions of a base pattern and also includes a start-of-message (SOM) word. The SOM word and the multiple repetitions of the base pattern each conform to a constant-amplitude continuous-phase frequency modulation (CACPFM) scheme, although not necessarily the same CACPFM scheme.

The method may include shifting the samples of the received signal based on a coarse estimate for a start-of-frame time to determine samples $x_1(n)$.

The method may also include maximizing a first function with respect to shift index q, where the first function is a sum of square magnitudes of cross-correlation sums C(s,q) over index s, where the cross-correlation sum C(s,q) is a cross-correlation sum between a model sequence p(n) and a subsequence of the samples $x_1(n)$ shifted by a sample distance sSL+q, where S is a number of symbols in the base pattern, where L is the oversampling factor (i.e., the number of samples per symbol), where the model sequence p(n) is based on a known model of the base pattern.

The method may also include shifting the samples $x_1(n)$ by an amount depending on the maximizing value of the shift index q to obtain samples $x_2(n)$.

The method may also include identifying a beginning of the payload data within the samples $x_2(n)$ by demodulating the samples $x_2(n)$ to obtain demodulated bits and detecting an end of the start-of-message word in a given one of the preambles.

The method may also include computing the coarse estimate for the start-of-frame time by maximizing a second function of time displacement, where the second function is a magnitude of a correlation sum between two windows of the samples of the received signal, where a first of the two windows is displaced by an amount equal to the time displacement, where a second of the two windows is separated from the first window by a fixed sample distance equal to a frame length.

In some embodiments, the method may also include: demodulating the payload data within the samples $x_2(n)$ in order to recover information bits; and driving an output device with an output signal derived from the information bits.

In some embodiments, the action of demodulating the payload data within the samples $x_2(n)$ comprises performing maximum likelihood sequence estimation on the payload data within the samples $x_2(n)$.

In some embodiments, the constant-amplitude continuous-phase frequency modulation associated with the multiple repetitions of the based pattern is CPM or MSK.

In some embodiments, the samples of the received signal are obtained at a rate that is an integer multiple of a symbol rate.

In some embodiments, the payload data of each frame conforms a constant-amplitude continuous-phase frequency modulation scheme different from the constant-amplitude continuous-phase frequency modulation scheme associated with the multiple repetitions of the base pattern.

BRIEF DESCRIPTION OF THE DRAWINGS

A better understanding of the present invention can be obtained when the following detailed description of the preferred embodiments is considered in conjunction with the following drawings.

FIG. 2 illustrates one embodiment of a method for performing carrier phase and frequency offset correction.

FIG. 3 illustrates one embodiment of a method for performing frame and symbol timing synchronization on a received signal.

Figure 1:
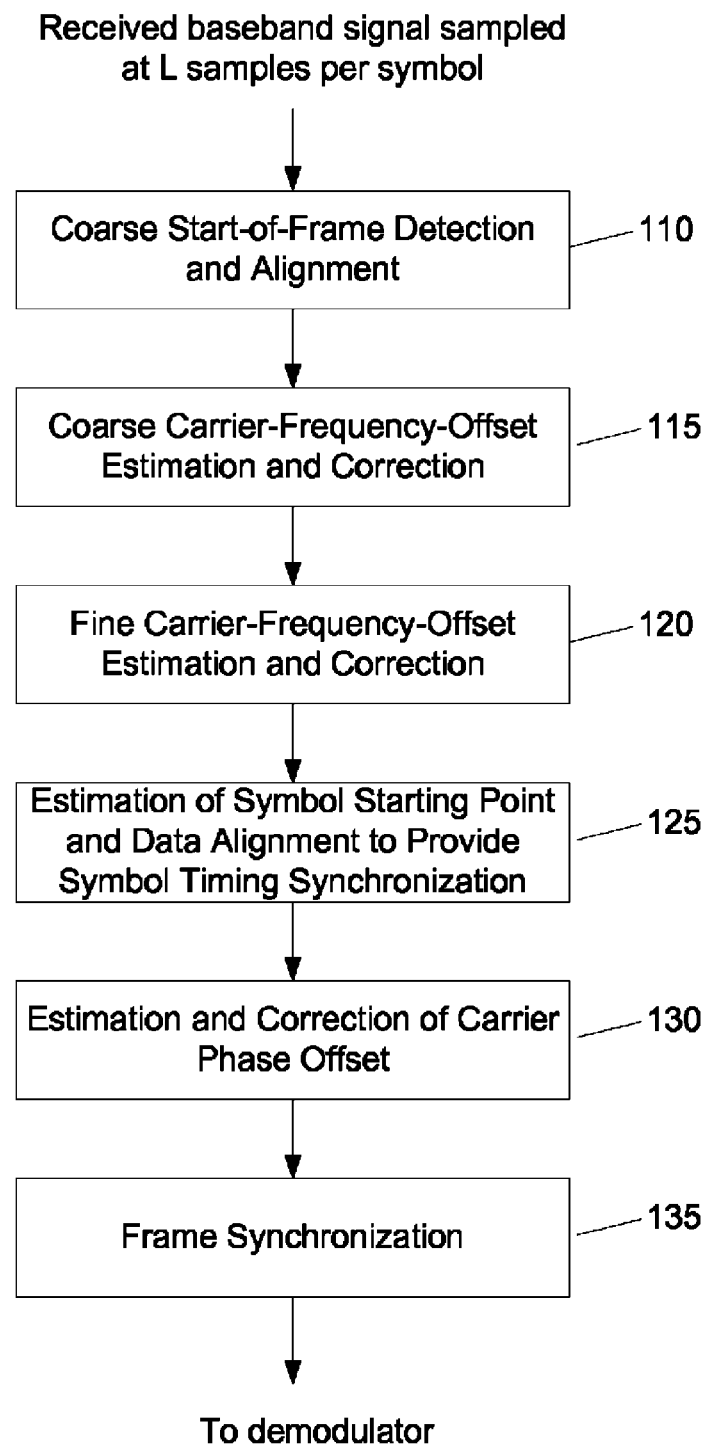
FIG. 1 illustrates a baseband receiver structure according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip, film, etc.; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program. The graphical program may be configured to perform any of the method embodiments described herein, or any combination of method embodiments described herein, or any subset of any of the method embodiments described herein, or any combination of such subsets.

Input data to a graphical program may be received from any of various sources, such as a receiver (e.g., an RF receiver) or a receiver front end, a signal processing board, a modem, a network interface (e.g., a wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a tablet computer, a network appliance, an Internet appliance, a handheld or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "standalone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

The various embodiments described herein may be realized in any of various forms. For example, any of the various embodiments may be realized as a computer-implemented method, a computer-readable memory medium, or a computer system. Furthermore, any of the various embodiments may be realized using one or more custom-designed hardware devices such as ASICs.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer, a computer integrated in a head-mounted display, etc.

In some embodiments, a set of computers distributed across a computer network may be configured to partition the effort of executing a computational method (e.g., any of the method embodiments disclosed herein).

In some embodiments, a first computer system may be configured to receive a modulated signal, down-convert the modulated signal to baseband, and capture samples of the baseband signal. The first computer system may send the captured samples to a second computer system through the computer network. The second computer system may operate on the signal samples according to any of the method embodiments described herein, or, any combination of the method embodiments described herein, or, any subset of any of the method embodiments described herein, or, any combination of such subsets.

The following is a list of acronyms used herein:
CACPFM Constant-Amplitude Continuous-Phase Frequency Modulation
CPFSK Continuous-Phase FSK
CPM Continuous Phase Modulation
FSK Frequency Shift Keying
MLSE Maximum Likelihood Sequence Estimation
MSK Minimum Shift Keying
SNR Signal-to-Noise Ratio
SOM Start of Message
TDMA Time Division Multiple Access Various embodiments described herein apply to the design of a baseband receiver for a communication system. The communication system may have one or more of the following transmission characteristics. (It is noted that many telemetry and military communication systems have these system characteristics.)

1. It is a TDMA system, preferably without any idle interval between frames. Information is preferably transmitted in constant-length frames (or packets).

2. A frame has a known preamble followed by data that is preferably modulated according to a constant-amplitude continuous-phase frequency modulation (CACPFM) scheme. Examples of modulation schemes falling in the CACPFM category include CPFSK, multi-h CPM and MSK. The known preamble is assumed to be modulated by a similar or different modulation scheme belonging to the CACPFM category. The preamble may include two parts. The first part includes multiple repetitions of a modulated waveform whose spectrum exhibits distinct peaks at known frequency positions. The second part of the preamble includes another known modulated pattern, which is referred to herein as the start of message (SOM) word. In one embodiment, the preamble comprises 34 repetitions of a "1100" pattern being modulated by minimum shift keying (MSK) followed by the SOM word. It is noted that the modulation scheme for the SOM word need not be the same as the modulation scheme used for the rest of the preamble or the payload. Furthermore, the SOM word can take any value as long as it is known to the receiver.

3. The transmission medium is preferably a medium with a coherence bandwidth significantly larger than the signal bandwidth. In various embodiments, the transmission medium may be air, free space, a cable, etc. At the receiver front end, it is assumed that white thermal noise of unknown power spectral density gets added to the received signal.

4. The received signal is preferably oversampled by a factor L known at the receiver, where L is an integer greater than one.

In one set of embodiments, a method for frame and carrier synchronization is performed as described below. In some embodiments, the method may show robust performance at low signal-to-noise ratio (SNR) and at high values of carrier frequency offset (CFO).

FIG. 1 shows the flow of information through the baseband receiver structure, according to one set of embodiments. At 110, a coarse start-of-frame detection and alignment process is performed. At 115, a coarse carrier-frequency-offset estimation and correction process is performed. At 120, a fine carrier-frequency-offset estimation and correction process is performed. At 125, an estimation of symbol starting point is performed along with data alignment to achieve symbol timing synchronization. At 130, estimation and correction of carrier phase offset is performed. At 135, a frame synchronization process is performed (based on the SOM word). The frame synchronization serves to detect the start of the payload data within the frame. After frame synchronization, the samples may be provided to a demodulator.

Coarse Start of Frame Detection 110

An auto-correlation sum is computed between two windows of samples of the received signal. Each window has sample length equal to the length of the preamble. The windows are separated by a constant distance equal to the length of a frame. (The length of a frame is fixed and known to the receiver.) The auto-correlation sum is computed for successive positions of the pair of windows. In other words, for each value of a shift index q in a given range, the pair of windows is shifted by q relative to the received signal (while maintaining the constant separation distance between the two windows of the pair), and the auto-correlation sum is computed based on the shifted windows. The shift at which the auto-correlation sum is maximized is taken as the approximate start time $q_{SOF}$ of the frame:

$$q_{SOF} = \underset{q}{\operatorname{argmax}} \left| \sum_{i=0}^{N_p L-1} r(q+i) r^*(q+i+N) \right|,$$

where $N_p$ is the number of symbols of the preamble, where $r(n)$ is the received complex baseband signal, where N is the length of a frame in terms of number of samples. In one embodiment, the shift parameter q varies over the range from 0 to the length of one frame, e.g., over the range: $0 \leq q \leq 2N - N_p$.

After computing the start time $q_{SOF}$, the received signal $r(n)$ is aligned (i.e., shifted) to obtain signal $r_1(n)$ based on the expression:

$$r_1(n) = r(n + q_{SOF}).$$

Coarse Carrier-Frequency-Offset Estimation and Correction 115

The repetitive pattern in the first part of the preamble implies that the FFT magnitude spectrum of first part of the preamble in the signal $r_1(n)$ will have certain distinct tones of significantly higher amplitude than the rest of the spectrum. For coarse estimation of the carrier frequency offset, the FFT magnitude spectrum of the first $(N_{p1}L)$ samples of $r_1(n)$ and the FFT magnitude spectrum of the first part of a locally-generated reference preamble signal are cross-correlated over a range of cyclic shifts. The shift at which the cross-correlation achieves a maximum is a coarse estimate of the carrier frequency offset:

$$\hat{f}_0 = \frac{F_S}{N_{p1}L} \underset{m}{\operatorname{argmax}} \left[ \sum_{k=0}^{N_{p1}L-1} |R((k+m)_{N_{p1}L})||P(k)| \right].$$

The integer value $N_{p1}$ is the number of symbols in the first part of the preamble. The value $N_{p1}$ is equal to number $N_R$ of repetitions of the basic symbol pattern multiplied by the number S of symbols in the each repetition. Frequency $F_S$ is the sampling frequency at the analog-to-digital (A/D) converter at the receiver front end. Spectrum $R(k)$ is the $(N_{p1}L)$-point FFT of the first $(N_{p1}L)$ samples of signal $r_1(n)$. Spectrum $P(k)$ is the $(N_{p1}L)$-point FFT of the first part (i.e., the repetitive part) of the reference preamble. The notation "$(u)_v$" is equivalent to the expression "u mod v".

The baseband signal $r_1(n)$ is then compensated for the carrier frequency offset, e.g., based on the expression:

$$r_2(n) = r_1(n) \exp\left[ -j 2\pi \frac{\hat{f}_0}{F_S} n \right].$$

The compensated signal $r_2(n)$ is used in further processing operations described below.

Fine Carrier-Frequency-Offset Estimation and Correction 120

The coarse estimation of carrier frequency offset is limited by the resolution bandwidth of the FFT. (The resolution bandwidth is the frequency separation between adjacent frequency states of the FFT.) Thus, a residual carrier frequency offset may be present in the compensated signal $r_2(n)$. The residual carrier frequency offset may be estimated by making use of the repetitive nature of the symbols in the first part of the preamble, e.g., as illustrated in the following steps.

1. Initialize p to 1, where p is the distance, in terms of symbols, between repetitions of the basic symbol pattern in the first part of the preamble.

2. Compute an average phase offset $\theta(p)$ by (a) computing a correlation sum between the first part (the repetitive part) of the preamble in the signal $r_2(n)$ and a shifted version of that part, where the shifted version has been shifted by p repetitions of the basic symbol pattern, and (b) computing the argument (angle) of the correlation sum. In other words, $$\theta(p) = \frac{1}{2\pi SL} \arg\left[ \sum_{n=0}^{N_{p1}L - pSL} r_2(n + pSL) r_2^*(n) \right].$$

3. Repeat step 2 for all values of p up to a maximum value $p_{MAX}$. The maximum value $p_{MAX}$ may be constrained by the condition that the accumulated phase difference between two repetitions of the base pattern separated by the maximum value $p_{MAX}$ does not wrap around, even for the maximum expected residual carrier frequency offset. Additionally, the maximum value $p_{MAX}$ may also be less than or equal to the total number $N_R$ of repetitions of the basic symbol pattern minus a number of repetitions corresponding to the maximum expected symbol error of the coarse start-of-frame detection is subtracted.

4. Perform a least squares linear fit on the phase differences $\theta(p)$ computed above. The least squares linear fit produces a slope for an optimal line that fits the data $\{(p, \theta(p))\}$. The slope of the optimal line is an estimate $\hat{f}_r$ of the residual carrier frequency offset.

The signal $r_2(n)$ is then compensated for the residual carrier frequency offset, e.g., based on the expression:

$$r_3(n) = r_2(n)\exp\left[-j2\pi\frac{\hat{f}_r}{F_S}n\right].$$

Symbol Timing Synchronization 125

As noted above, the received signal is preferably oversampled at L samples per symbol. Symbol timing synchronization 125 operates to determine the modulo-L sample time that corresponds to the symbol starting points. Also recall that the first part of the preamble includes multiple repetitions of a base pattern, each repetition of the base pattern including S symbols. The symbol timing synchronization 125 may include the following operations.

1. A locally-generated replica of the modulated base pattern p(n), oversampled by factor L (the oversampling factor of the received signal), is used as a reference signal. This reference signal has SL samples.

2. A sequence of $N_C$ cross-correlation sums is computed between the reference signal and $N_C$ successive portions of the shifted sequence $\{r_3(n+q)\}$, where q denotes the shift amount. Each of the portions is SL samples in length. Furthermore, each portion is shifted by SL samples relative to the previous portion of the succession of portions. In other words, $$C(s, q) = \sum_{m=0}^{SL-1} r_3(sSL + m + q)p^*(m),$$

for s=0, 1, 2, . . . , $N_C$−1. The parameter $N_C$ satisfies the constraint $N_C+N_D<N_R$, where $N_D$ is the number of repetitions of the base pattern discarded from the beginning of the sequence $r_3(n)$.

3. A sum $V_q$ of the square magnitudes of the cross-correlation sums is computed:

$$V_q = \sum_{s=0}^{N_C-1} |C(s, q)|^2.$$

Each of the parameters $N_R$, $N_C$ and $N_D$ admits variation, and a wide variety of embodiments are contemplated where these parameters take various combinations of values. In one particular embodiment, where $N_R$=34, we used $N_C$=17 after discarding the first $N_D$=5 repetitions.

4. Repeat steps 2 and 3 for all values of the sample shifts m from zero up to (SL−1).

5. The modulo-L value of the sample shift q that gives the maximum value of $V_q$ is the optimal symbol starting point $q_{SSP}$. In other words, $$q_{MAX} = \arg\max_{0 \le q < SL}\left[\sum_{s=0}^{N_C-1}\left|\sum_{m=0}^{SL-1} r_3(sSL + m + q)p^*(m)\right|^2\right],$$

$$q_{SSP} = q_{MAX}\%L,$$

where "%" means "modulo".

6. The sequence $r_3(n)$ is aligned to obtain sequence $r_4(n)$:

$$r_4(n)=r_3(n+q_{MAX}).$$

Carrier Phase Synchronization 130

The carrier phase offset is estimated as follows. Because of the phase-continuous nature of the preamble and the repetitive modulation-pattern, the carrier phase is periodic with a period of SL. A reference preamble sequence p(n) of length corresponding to the first $N_S$ symbols of the preamble is generated, where $N_S$ is less than $N_{p1}$, but large enough to assume that the preamble sequence achieves i.i.d. characteristics. (The acronym "i.i.d." means "independent and identically distributed".) The samples of the reference preamble sequence are complex-conjugated. The conjugated samples are multiplied by corresponding samples of the sequence $r_4(n)$ to form corresponding products. The carrier phase at the beginning of the preamble is estimated as the argument (i.e., angle) of the sum of the products:

$$\hat{\varphi} = \arg\left[\sum_{m=0}^{N_SL-1} r_4(m)p^*(m)\right].$$

The summation in the above expression may be interpreted as an inner product (in the complex sense) between sequence $r_4(m)$ and the reference preamble sequence p(m).

Samples $r_4(n)$ are compensated for the carrier phase offset to obtain samples $r_5(n)$:

$$r_5(n)=r_4(n)\exp[-j\hat{\varphi}].$$

Frame Synchronization 135

The signal $r_5(n)$ is fed to the reference demodulator. The reference demodulator operates on the signal $r_5(n)$ to produce a sequence of demodulated bits. (In one embodiment, a maximum likelihood sequence estimation (MLSE) technique is employed to perform the demodulation.) The demodulated bits are checked for a sequence of length $L_{SOM}$ (i.e., the known bit length of the SOM word) that is closest in Hamming distance sense to the known SOM word. The end of the detected SOM word defines the start of the payload data.

In one set of embodiments, a method for performing carrier phase and frequency offset correction on samples $x_1(n)$ of a received signal may include the operations shown in FIG. 2. The received signal includes a series of frames. Each frame includes a preamble and payload data. The preamble of each frame includes multiple repetitions of a base pattern. The multiple repetitions of the base pattern conform to a constant-amplitude continuous-phase frequency modulation scheme. In other words, it is assumed that the multiple repetitions of the base pattern have been modulated (at a transmitter) with a constant-amplitude continuous-phase frequency modulation scheme.

At 210, a computer system (e.g., any of the various computer systems described herein or any combination thereof) may compute a discrete Fourier transform R(k) of a subsequence of the samples $x_1(n)$. The subsequence corresponds to the multiple repetitions of the base pattern within a given one of the preambles (i.e., the preamble within a given one of the frames). In some embodiments, the multiple repetitions of the base pattern are as described above in connection with FIG. 1.

At 215, the computer system may compute a coarse estimate for a carrier frequency offset by maximizing a cyclic cross-correlation between a magnitude of R(k) and a magnitude of spectrum P(k), e.g., as described above. The spectrum P(k) is a discrete Fourier transform of a known model of the multiple repetitions of the base pattern, e.g., as described above in connection with FIG. 1.

At 220, the computer system may apply a frequency correction to the samples $x_1(n)$ based on the coarse estimate for the carrier frequency offset in order to determine samples $x_2(n)$. For example, the frequency correction may be applied by multiplying the samples $x_1(n)$ by a complex exponential as described above in connection with operation 115 of FIG. 1.

At 225, the computer system may compute values $\theta(p)$ of a function $\theta$ corresponding to a number of values of positive integer index p, e.g., as described above in connection with FIG. 1. The value $\theta(p)$ is a phase difference between a first subsequence of the samples $x_2(n)$ and a second subsequence of the samples $x_2(n)$, where the first and second subsequences reside within the given preamble, where the first and second subsequences are separated by a sample distance equal to p repetitions of the base pattern.

At 230, the computer system may compute a fine estimate for residual carrier frequency offset by estimating a linear slope of the function $\theta$ relative to positive integer index p, e.g., as described above in connection with FIG. 1.

At 235, the computer system may apply a frequency correction to the samples $x_2(n)$ based on the fine estimate for the residual carrier frequency offset in order to determine samples $x_3(n)$. For example, the frequency correction may be applied by multiplying the samples $x_2(n)$ by a complex exponential as described above in connection with operation 120 of FIG. 1.

At 240, the computer system may compute an inner product between a model sequence g(n) and a subsequence of the samples $x_3(n)$, e.g., as described above in connection with operation 130 of FIG. 1. The subsequence of the samples $x_3(n)$ resides within the given preamble. The inner product is computed in a complex sense. The model sequence g(n) corresponds to a subsequence of the known model of the multiple repetitions of the base pattern, e.g., a subsequence as discussed above in connection with operation 130 of FIG. 1. In that discussion, the model sequence is denoted p(n).

At 245, the computer system may apply a phase correction to the samples $x_3(n)$ based on an angle of the inner product value in order to obtain samples $x_4(n)$, e.g., as described above in connection with operation 130 of FIG. 1. (The inner product value is a complex number, and thus, has both a magnitude and an angle.)

In some embodiments, the computer system may also demodulate a payload portion of the samples $x_4(n)$ to obtain information bits, and drive an output device with an output signal derived from the information bits. The output device may be any desired device or set of devices. For example, the output device may be a speaker and/or a display.

In some embodiments, the information bits resulting from the demodulation process may be sent to (or made available to) a host computer for further processing.

In one embodiment, the process of demodulating the payload portion of the samples $x_4(n)$ includes performing maximum likelihood sequence estimation on the payload portion of the samples $x_4(n)$. (The technique of maximum likelihood sequence estimation is well known in the art and need not be further explained.) However, in other embodiments, other demodulation techniques like phase discrimination may be used.

In some embodiments, the constant-amplitude continuous-phase frequency modulation is CPM or MSK.

In some embodiments, the action of computing the fine estimate for residual carrier frequency offset includes performing a least squares linear fit on the data computed in operation 225 in order to obtain the linear slope of the function $\theta$ relative to positive integer index p. The data may include the set of ordered pairs $\{(p, \theta(p))\}$ generated in operation 225.

In some embodiments, the samples $x_1(n)$ of the received signal are obtained at a rate that is an integer multiple L of a symbol rate. L is an integer greater than one. In some embodiments, L is a value in the range $4 \leq L \leq 16$. However, other ranges are contemplated. In one embodiment, L is 4. In another embodiment, L is 8.

In some embodiments, it is assumed that the payload data conforms to a constant-amplitude continuous-phase frequency modulation scheme which is the same as or different from the constant-amplitude continuous-phase frequency modulation scheme used to modulate the multiple repetitions of the base pattern within the preamble.

In one set of embodiments, a method for performing frame and symbol timing synchronization on samples of a received signal may involve the operations shown in FIG. 3. The received signal includes a series of frames. Each frame includes a preamble and payload data. The preamble of each frame includes multiple repetitions of a base pattern and also includes a start-of-message (SOM) word, e.g., as variously described above. The multiple repetitions of the base pattern conform to a constant-amplitude continuous-phase frequency modulation scheme.

At 310, a computer system (e.g., any of the various computer systems described herein or any combination thereof) may compute a coarse estimate for a start-of-frame time by maximizing a first function of time displacement, e.g., as described above in connection with operation 110 of FIG. 1. The first function is a magnitude of a correlation sum between two windows of the samples of the received signal, where a first of the two windows is displaced by an amount equal to the time displacement, where a second of the two windows is separated from the first window by a fixed sample distance equal to a frame length.

At 315, the computer system may shift the samples based on the coarse estimate for the start-of-frame time to determine samples $x_1(n)$.

At 320, the computer system may maximize a second function with respect to shift index q, e.g., as described above in connection with operation 125 of FIG. 1. The second function is a sum of square magnitudes of cross-correlation sums C(s,q) over index s. The cross-correlation sum C(s,q) is a cross-correlation sum between a model sequence p(n) and a subsequence of the samples $x_1(n)$ shifted by a sample distance sSL+q, where S is a number of symbols in the base pattern. L is the number of samples per symbol. The model sequence p(n) is based on a known model of the base pattern.

At 325, the computer system may shift the samples $x_1(n)$ by an amount depending on the maximizing value of the shift index q to obtain samples $x_2(n)$. For example, the shift operation may be performed as described above in connection with operation 125 of FIG. 1.

At 330, the computer system may identify a beginning of the payload data within the samples $x_2(n)$ by demodulating the samples $x_2(n)$ to obtain demodulated bits, and scanning the demodulated bits to detect an end of the start-of-message (SOM) word in the preamble. In some embodiments, the payload data is immediately preceded by the SOM word.

In some embodiments, the computer system may also demodulate the payload data within the samples $x_2(n)$ in order to recover information bits. The computer system may drive an output device with an output signal derived from the information bits. The output device may be any desired device or set of devices. For example, the output device may be a speaker and/or display device.

In some embodiments, the information bits resulting from the demodulation process may be sent to (or made available to) a host computer for further processing.

In some embodiments, the action of demodulating comprises performing maximum likelihood sequence estimation on the payload data within the samples $x_2(n)$. However, in other embodiments, other demodulation methods like phase discrimination may be used.

In some embodiments, the constant-amplitude continuous-phase frequency modulation is CPM or MSK.

In some embodiments, the samples of the received signal are obtained at a rate that is an integer multiple L of the underlying symbol rate.

In some embodiments, the payload data of each frame conforms to a constant-amplitude continuous-phase frequency modulation that is the same as or different from the constant-amplitude continuous-phase frequency modulation used to modulate the multiple repetitions of the base pattern of each frame.

The following numbered paragraphs describe various additional embodiments.

1. A method for performing carrier phase and frequency offset correction on samples $x_1(n)$ of a received signal, wherein the received signal corresponds to a constant-amplitude continuous-phase modulation, wherein the received signal includes a series of frames, wherein each frame includes a preamble, a start-of-message (SOM) word and payload data, wherein the preamble includes multiple repetitions of a base pattern, the method comprising:

computing a discrete Fourier transform R(k) of a subsequence of the samples $x_1(n)$, wherein the subsequence corresponds to the multiple repetitions of the base pattern within a first of the preambles;

computing a coarse estimate for a carrier frequency offset by maximizing a cyclic cross-correlation between a magnitude of R(k) and a magnitude of spectrum P(k), wherein P(k) is a discrete Fourier transform of a known model of the multiple repetitions of the base pattern;

applying a frequency correction to the samples $x_1(n)$ based on the coarse estimate for the carrier frequency offset in order to determine samples $x_2(n)$;

computing values $\theta(p)$ of a function $\theta$ for a number of values of positive integer index p, wherein $\theta(p)$ is a phase difference between a first subsequence of the samples $x_2(n)$ and a second subsequence of the samples $x_2(n)$, wherein the first and second subsequences reside within the first preamble, wherein the first and second subsequences are separated by a sample distance equal to p repetitions of the base pattern within said multiple repetitions of the base pattern;

computing a fine estimate for residual carrier frequency offset by estimating a linear slope of the function $\theta$ relative to positive integer index p;

applying a frequency correction to the samples $x_2(n)$ based on the fine estimate for the residual carrier frequency offset in order to determine samples $x_3(n)$;

computing an inner product between a second model sequence g(n) and a subsequence of the samples $x_3(n)$, wherein the subsequence of the samples $x_3(n)$ resides within the first preamble, wherein the inner product is computed in a complex sense;

applying a phase correction to the samples $x_3(n)$ based on an angle of the inner product in order to obtain samples $x_4(n)$.

2. The method of paragraph 1, further comprising: demodulating the samples $x_4(n)$ to obtain information bits, and driving an output device with an output signal derived from the information bits.

3. A method for performing frame and symbol timing synchronization on samples of a received signal, wherein the received signal corresponds to a constant-amplitude continuous-phase modulation, wherein the received signal includes a series of frames, wherein each frame includes a preamble, a start-of-message (SOM) word and payload data, wherein the preamble includes multiple repetitions of a base pattern, the method comprising:

computing a coarse estimate for a start-of-frame time by maximizing a first function of time displacement, wherein the first function is an autocorrelation between two windows of the samples, wherein a first of the two windows is displaced by an amount equal to the time displacement, wherein a second of the two windows is separated from the first window by a fixed sample distance equal to a known sample distance between two successive preambles;

shifting the samples based on the coarse estimate for the start-of-frame time to determine samples $x_1(n)$;

maximizing a second function with respect to shift index q, wherein the second function is a sum of square magnitudes of cross-correlations C(s,q) over index s, wherein the cross-correlation C(s,q) is a cross-correlation between a model sequence p(n) and a subsequence of the samples $x_1(n)$ shifted by a sample distance sSL+q, where S is a number of symbols in the base pattern, wherein L is the number of samples per symbol, wherein the model sequence p(n) is based on a known model of the base pattern;

shifting the samples $x_1(n)$ by an amount depending on the maximizing value of the shift index q to obtain samples $x_2(n)$;

identifying a beginning of the payload within the samples $x_2(n)$ by demodulating the samples $x_2(n)$ to obtain demodulated bits and detect an end of the start-of-message word in the first preamble.

4. The method of paragraph 3 further comprising: demodulating the payload data within the samples $x_2(n)$ in order to recover information bits; and driving an output device with an output signal derived from the information bits.

5. A method for performing frame and carrier synchronization on samples of a received signal, wherein the received signal corresponds to a constant-amplitude continuous-phase modulation, wherein the received signal includes a series of frames, wherein each frame includes a preamble, a start-of-message (SOM) word and payload data, wherein the preamble includes multiple repetitions of a base pattern, the method comprising:

(a) computing a coarse estimate for a start-of-frame time by maximizing a first function of time displacement, wherein the first function is an autocorrelation between two windows of the samples, wherein a first of the two windows is displaced by an amount equal to the time displacement, wherein a second of the two windows is separated from the first window by a fixed sample distance equal to a known sample distance between two successive preambles;

(b) shifting the samples based on the coarse estimate for the start-of-frame time to determine samples $r_1(n)$;

(c) computing a discrete Fourier transform R(k) of a subsequence of the samples $r_1(n)$, wherein the subsequence corresponds to the multiple repetitions of the base pattern within a first of the preambles;

(d) computing a coarse estimate for a carrier frequency offset by maximizing a cyclic cross-correlation between a magnitude of R(k) and a magnitude of spectrum P(k), wherein P(k) is the discrete Fourier transform of a known model of the multiple repetitions of the base pattern;

(e) applying a frequency correction to the samples $r_1(n)$ based on the coarse estimate for the carrier frequency offset in order to determine samples $r_2(n)$;

(f) computing values $\theta(p)$ of a function $\theta$ for a number of values of positive integer index p, wherein $\theta(p)$ is a phase difference between a first subsequence of the samples $r_2(n)$ and a second subsequence of the samples $r_2(n)$, wherein the first and second subsequences reside within the first preamble, wherein the first and second subsequences are separated by a sample distance equal to p repetitions of the base pattern within said multiple repetitions of the base pattern;

(g) computing a fine estimate for residual carrier frequency offset by estimating a linear slope of the function θ relative to positive integer index p;

(h) applying a frequency correction to the samples $r_2(n)$ based on the fine estimate for the residual carrier frequency offset in order to determine samples $r_3(n)$;

(i) maximizing a second function with respect to shift index q, wherein the second function is a sum of square magnitudes of cross-correlations C(s,q) over index s, wherein the cross-correlation C(s,q) is a cross-correlation between a model sequence p(n) and a subsequence of the samples $r_3(n)$ shifted by a sample distance sSL+q, where S is a number of symbols in the base pattern, wherein L is the number of samples per symbol, wherein the model sequence p(n) is based on a known model of the base pattern;

(j) shifting the samples $r_3(n)$ by an amount depending on the maximizing value of the shift index q to obtain samples $r_4(n)$;

(k) computing an inner product between a second model sequence g(n) and a subsequence of the samples $r_4(n)$, wherein the subsequence of the samples $r_4(n)$ resides within the first preamble, wherein the inner product is computed in a complex sense;

(l) applying a phase correction to the samples $r_4(n)$ based on an angle of the inner product to obtain samples $r_5(n)$;

(m) identifying a beginning of the payload data within the samples $r_5(n)$ by demodulating the samples $r_5(n)$ to obtain demodulated bits and detect an end of the start-of-message word in the first preamble.

6. The method of paragraph 5, further comprising: demodulating the payload data to obtain information bits; and driving an output device in response to the information bits.

Figure 4:
FIG. 4 illustrates one embodiment of a receiver configured to perform any of the method embodiments described herein.

Any of the method embodiments described herein (or any combination of the method embodiments described herein, or any subset of any of the method embodiments described herein, or any combination of such subsets) may operate as part of a receiver, e.g., as illustrated by receiver 420 of FIG. 4. The receiver 420 is configured to receive and operate on signal transmissions from transmitter 410. The transmitter 410 may receive a stream of data bits from an information source, package the stream of data bits into a series of frames (i.e., into the payloads of the frames), and transmit the frames using one or more continuous-amplitude continuous-phase frequency modulation schemes. As described above, payloads may be modulated with a different continuous-amplitude continuous-phase frequency modulation scheme than preambles. Furthermore, the periodic portion of the preamble may be modulated with a different continuous-amplitude continuous-phase frequency modulation scheme than the SOM word.

In some embodiments, the receiver 420 also includes the ability to transmit, and thus, operates as a transceiver.

In some embodiments, the receiver 420 is configured as a modem, e.g., a modem for satellite communication. For example, the modem may be configured for operation on a satellite in order to facilitate communication with another satellite or with a terrestrial communication station (or communication device). As another example, the model may be configured for operation as part of or in association with a terrestrial communication station (or communication device) in order to facilitate communication with a satellite.

In some embodiments, the receiver 420 is configured as a network interface for a computer system.

In some embodiments, the receiver 420 is configured as a mobile phone or mobile communication device.

Figure 5:
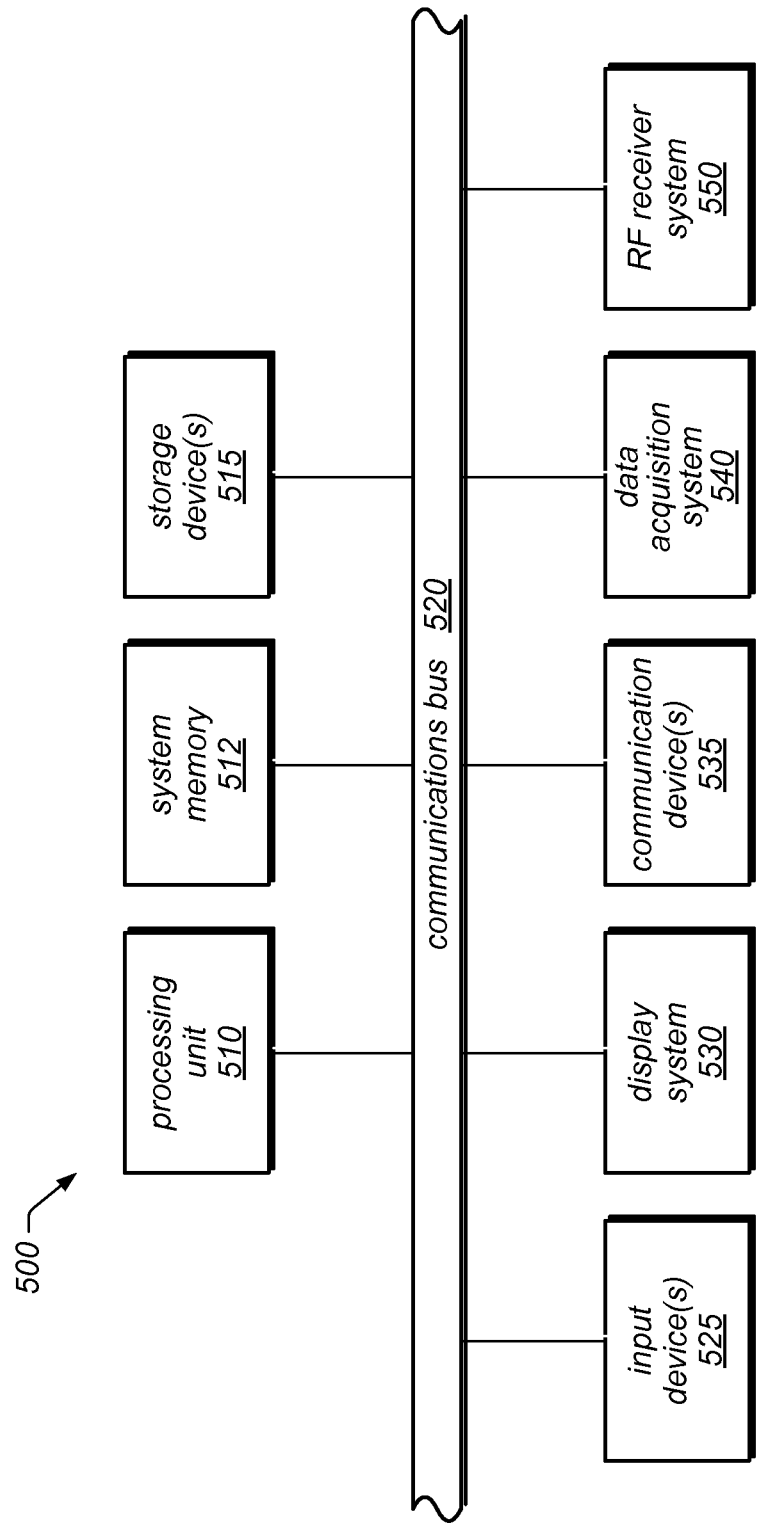
FIG. 5 illustrates one embodiment of a computer system that may be used to perform any of the method embodiments described herein.

FIG. 5 illustrates one embodiment of a computer system 500 that may be used to perform any of the method embodiments described herein, or, any combination of the method embodiments described herein, or, any subset of any of the method embodiments described herein, or, any combination of such subsets.

Computer system 500 may include a processing unit 510, a system memory 512, a set 515 of one or more storage devices, a communication bus 520, a set 525 of input devices, and a display system 530.

System memory 512 may include a set of semiconductor devices such as RAM devices (and perhaps also a set of ROM devices).

Storage devices 515 may include any of various storage devices such as one or more memory media and/or memory access devices. For example, storage devices 915 may include devices such as a CD/DVD-ROM drive, a hard disk, a magnetic disk drive, magnetic tape drives, etc.

Processing unit 510 is configured to read and execute program instructions, e.g., program instructions stored in system memory 512 and/or on one or more of the storage devices 515. Processing unit 510 may couple to system memory 512 through communication bus 520 (or through a system of interconnected busses). The program instructions configure the computer system 500 to implement a method, e.g., any of the method embodiments described herein, or, any combination of the method embodiments described herein, or, any subset of any of the method embodiments described herein, or any combination of such subsets.

Processing unit 510 may include one or more processors (e.g., microprocessors).

One or more users may supply input to the computer system 500 through the input devices 525. Input devices 525 may include devices such as a keyboard, a mouse, a touch-sensitive pad, a touch-sensitive display screen, a drawing pad, a track ball, a light pen, a data glove, eye orientation and/or head orientation sensors, a microphone (or set of microphones), an accelerometer (or set of accelerometers), or any combination thereof.

The display system 530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 500 may include other devices, e.g., devices such as one or more graphics accelerators, one or more speakers, a sound card, a video camera, a video card, etc.

In some embodiments, computer system 500 may include one or more communication devices 535, e.g., a network interface card for interfacing with a computer network. In one embodiment, such a communication device may be used to receive a modulated signal and perform signal processing operations on the modulated signal, e.g., signal processing operations according to any of the method embodiments described herein.

In some embodiments, the communication devices may include a reconfigurable I/O (RIO) board that includes one or more programmable hardware elements (PHEs), one or more A/D converters and additional circuitry. The RIO board is programmable to achieve a user-desired configuration of input and/or output processing, e.g., via a program written using LabVIEW FPGA. In some embodiments, the additional circuitry of the RIO board may include circuitry optimized for various kinds of signal processing operations and/or circuitry configured for signal amplification, carrier generation and synchronization, clock signal generation and synchronization, RF down-conversion, any of various kinds of demodulation, etc. The RIO board may receive an input signal, down-convert the input signal to baseband, digitize the baseband signal, and make the digitized baseband samples available to the computer system 500 for further processing, e.g., processing according to any of the method embodiments disclosed herein. In some embodiments, the RIO board itself may operate on the digitized baseband samples according to any of the method embodiments disclosed herein. In some embodiments, the RIO board may include a processor and memory, where the processor is configured to execute program instructions that have been stored in the memory, e.g., program instructions that implement any of the method embodiments disclosed herein. In some embodiments, the one or more PHEs and the processor may be configured to divide the labor of performing a method, e.g., any of the method embodiments disclosed herein.

In some embodiments, the reconfigurable I/O board is one of the RIO boards provided by National Instrument Corporation.

The computer system may be configured with a software infrastructure including an operating system, and perhaps also, one or more graphics APIs (such as OpenGL®, Direct3D, Java 3D™). In some embodiments, the software infrastructure may include LabVIEW and/or LabVIEW FPGA, which are software products of National Instruments Corporation.

In some embodiments, the computer system 500 may be configured for coupling to a data acquisition system 540. The data acquisition system 540 is configured to receive analog inputs signals, to digitize the analog input signals, and to make those digitized signals available to the computer system 500. The data acquisition system 540 may operate under the control of the software executing on processor 510.

In some embodiments, the computer system 500 may be configured to interface with a specialized receiver system 550, e.g., an off-the-shelf receiver system designed for capturing radio signals (such as RF signals, wireless LAN signals, etc.), down-converting the captured signals, and sampling the down-converted signals.

In one set of embodiments, a vector signal analyzer (such as the NI PXIe-5663 or the NI PXIe-5663E) comprising two or more modules may be configured to down-convert a received signal and capture samples of the down-converted signal. For example, one of the modules may perform the down-conversion function, another module may perform the digitization function, while a third module may generate the local oscillator signal used in the down-conversion process. The modules may be configured for insertion in respective slots of a chassis (e.g., one of the chassis manufactured by National Instruments Corp.). The modules may be configured to operate under the control of a computer, e.g., a computer module that itself is inserted in the same chassis, or perhaps a separate computer (such as computer system 500) that couples to the chassis through an interface kit. The digitization module may provide the samples of the down-converted signal to the controlling computer so the controlling computer may perform a method based on those samples, e.g., any of the method embodiments described herein. Alternatively, one of the modules (e.g., the digitization module) may include computational resources for performing a method, e.g., any of the method embodiments described herein. Those computational resources may include one or more programmable processors (e.g., microprocessors) and/or one or more PHEs. In some embodiments, the controlling computer and one or more of the modules may be configured to divide the computational labor of a method, e.g., any of the method embodiments described herein. Various embodiments are contemplated along these lines, where the computational labor is divided in various ways.

Figure 6:
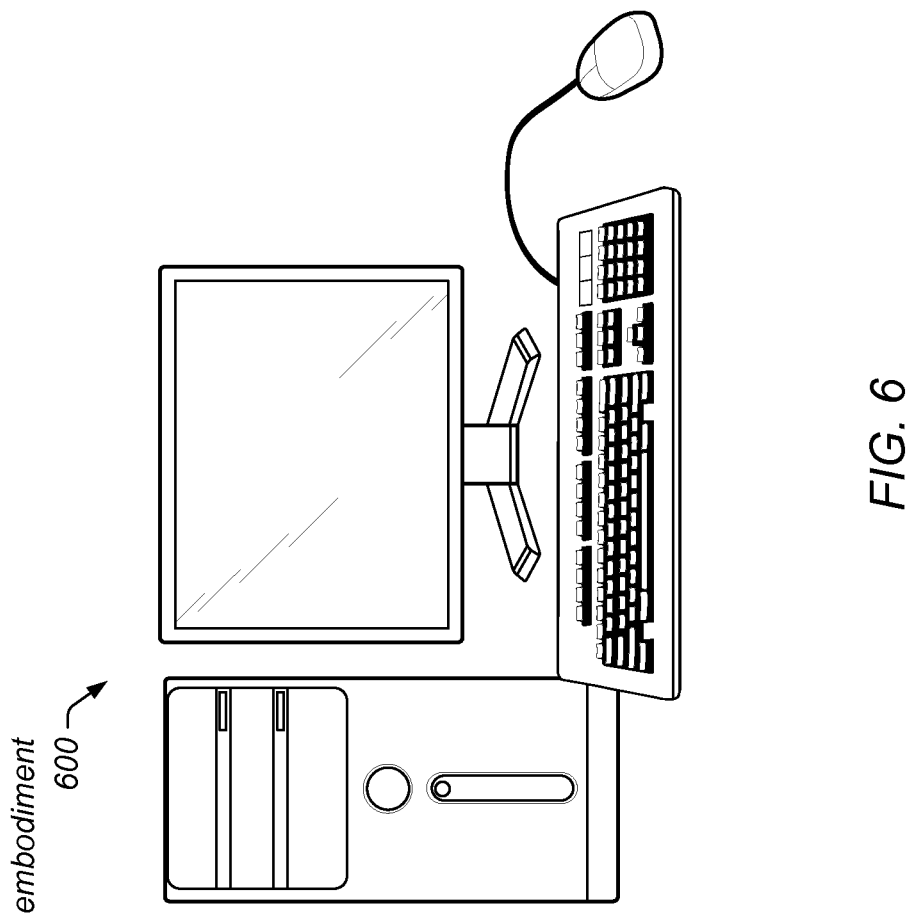
FIG. 6 illustrates one embodiment of the computer system of FIG. 5.

FIG. 6 illustrates one possible embodiment 500A of computer system 500.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing frame and symbol timing synchronization on samples of a received signal, wherein the received signal includes a series of frames, wherein each frame includes a preamble and payload data, wherein the preamble of each frame includes multiple repetitions of a base pattern and also includes a start-of-message (SOM) word, wherein the multiple repetitions of the base pattern conform to a first constant-amplitude continuous-phase frequency modulation scheme, the method comprising:

a computer system shifting the samples of the received signal based on a coarse estimate for a start-of-frame time to determine samples $x_1(n)$;

the computer system maximizing a first function with respect to shift index q, wherein the first function is a sum of square magnitudes of cross-correlation sums $C(s,q)$ over index s, wherein the cross-correlation sum $C(s,q)$ is a cross-correlation sum between a model sequence $p(n)$ and a subsequence of the samples $x_1(n)$ shifted by a sample distance $sSL+q$, where S is a number of symbols in the base pattern, wherein L is the number of samples per symbol, wherein the model sequence $p(n)$ is based on a known model of the base pattern;

the computer system shifting the samples $x_1(n)$ by an amount depending on the maximizing value of the shift index q to obtain samples $x_2(n)$; and the computer system identifying a beginning of the payload data within the samples $x_2(n)$ by demodulating the samples $x_2(n)$ to obtain demodulated bits and detecting an end of the start-of-message word in a first of the preambles.

2. The method of claim 1, further comprising:

the computer system computing the coarse estimate for the start-of-frame time by maximizing a second function of time displacement, wherein the second function is a magnitude of a correlation sum between two windows of the samples of the received signal, wherein a first of the two windows is displaced by an amount equal to the time displacement, wherein a second of the two windows is separated from the first window by a fixed sample distance equal to a frame length.

3. The method of claim 1, further comprising:

demodulating the payload data within the samples $x_2(n)$ in order to recover information bits; and driving an output device with an output signal derived from the information bits.

4. The method of claim 3, wherein said demodulating comprises performing maximum likelihood sequence estimation on the payload data within the samples $x_2(n)$.

5. The method of claim 1, wherein the samples of the received signal are obtained at a rate that is an integer multiple of a symbol rate.

6. The method of claim 1, wherein the payload data of each frame conforms a second constant-amplitude continuous-phase frequency modulation scheme different from the first constant-amplitude continuous-phase frequency modulation scheme.

7. A non-transitory computer-readable memory medium storing program instructions, wherein the program instructions, when executed by a computer system, cause the computer system to implement:
- receiving samples of a received signal, wherein the received signal includes a series of frames, wherein each frame includes a preamble and payload data, wherein the preamble of each frame includes multiple repetitions of a base pattern and also includes a start-of-message (SOM) word, wherein the multiple repetitions of the base pattern conform to a first constant-amplitude continuous-phase frequency modulation scheme;
- shifting the samples of the received signal based on a coarse estimate for a start-of-frame time to determine samples $x_1(n)$;
- maximizing a first function with respect to shift index q, wherein the first function is a sum of square magnitudes of cross-correlation sums C(s,q) over index s, wherein the cross-correlation sum C(s,q) is a cross-correlation sum between a model sequence p(n) and a subsequence of the samples $x_1(n)$ shifted by a sample distance sSL+q, where S is a number of symbols in the base pattern, wherein L is the number of samples per symbol, wherein the model sequence p(n) is based on a known model of the base pattern;
- shifting the samples $x_1(n)$ by an amount depending on the maximizing value of the shift index q to obtain samples $x_2(n)$; and
- identifying a beginning of the payload data within the samples $x_2(n)$ by demodulating the samples $x_2(n)$ to obtain demodulated bits and detecting an end of the start-of-message word in a first of the preambles.

8. The non-transitory computer-readable memory medium of claim 7, wherein the program instructions, when executed by the computer system, further cause the computer system to implement:
- computing the coarse estimate for the start-of-frame time by maximizing a second function of time displacement, wherein the second function is a magnitude of a correlation sum between two windows of the samples of the received signal, wherein a first of the two windows is displaced by an amount equal to the time displacement, wherein a second of the two windows is separated from the first window by a fixed sample distance equal to a frame length.

9. The non-transitory computer-readable memory medium of claim 7, wherein the non-transitory computer-readable memory medium comprises semiconductor-based memory.

10. The non-transitory computer-readable memory medium of claim 7, wherein the program instructions, when executed by the computer system, further cause the computer system to implement:
- demodulating the payload data within the samples $x_2(n)$ in order to recover information bits; and
- driving an output device with an output signal derived from the information bits.

11. The non-transitory computer-readable memory medium of claim 10, wherein said demodulating comprises performing maximum likelihood sequence estimation on the payload data within the samples $x_2(n)$.

12. The non-transitory computer-readable memory medium of claim 7, wherein the samples of the received signal are obtained at a rate that is an integer multiple of a symbol rate.

13. The non-transitory computer-readable memory medium of claim 7, wherein the payload data of each frame conforms a second constant-amplitude continuous-phase frequency modulation scheme different from the first constant-amplitude continuous-phase frequency modulation scheme.

14. A system for performing frame and symbol timing synchronization on samples of a received signal, wherein the received signal includes a series of frames, wherein each frame includes a preamble and payload data, wherein the preamble of each frame includes multiple repetitions of a base pattern and also includes a start-of-message (SOM) word, wherein the multiple repetitions of the base pattern conform to a first constant-amplitude continuous-phase frequency modulation scheme, the system comprising:
- a processor; and
- memory storing program instructions, wherein the program instructions, when executed by the processor, cause the processor to:
  - shift the samples of the received signal based on a coarse estimate for a start-of-frame time to determine samples $x_1(n)$;
  - maximize a first function with respect to shift index q, wherein the first function is a sum of square magnitudes of cross-correlation sums C(s,q) over index s, wherein the cross-correlation sum C(s,q) is a cross-correlation sum between a model sequence p(n) and a subsequence of the samples $x_1(n)$ shifted by a sample distance sSL+q, where S is a number of symbols in the base pattern, wherein L is the number of samples per symbol, wherein the model sequence p(n) is based on a known model of the base pattern;
  - shift the samples $x_1(n)$ by an amount depending on the maximizing value of the shift index q to obtain samples $x_2(n)$; and
  - identify a beginning of the payload data within the samples $x_2(n)$ by demodulating the samples $x_2(n)$ to obtain demodulated bits and detecting an end of the start-of-message word in a first of the preambles.

15. The system of claim 14, wherein the program instructions, when executed by the processor, further cause the processor to:
- compute the coarse estimate for the start-of-frame time by maximizing a second function of time displacement, wherein the second function is a magnitude of a correlation sum between two windows of the samples of the received signal, wherein a first of the two windows is displaced by an amount equal to the time displacement, wherein a second of the two windows is separated from the first window by a fixed sample distance equal to a frame length.

16. The system of claim 14, wherein the program instructions, when executed by the processor, further cause the processor to:
- demodulate the payload data within the samples $x_2(n)$ in order to recover information bits; and
- drive an output device with an output signal derived from the information bits.

17. The system of claim 16, wherein said demodulating comprises performing maximum likelihood sequence estimation on the payload data within the samples $x_2(n)$.

18. The system of claim 14, wherein the samples of the received signal are obtained at a rate that is an integer multiple of a symbol rate.

19. The system of claim 14, wherein the payload data of each frame conforms a second constant-amplitude continuous-phase frequency modulation scheme different from the first constant-amplitude continuous-phase frequency modulation scheme.

20. The system of claim 14, wherein the program instructions, when executed by the processor, further cause the processor to:
   demodulate the payload data within the samples $x_2(n)$ in order to recover information bits; and
   store the information bits in the memory.

* * * * *